(No Model.)

W. S. POST.
Refrigerator.

No. 242,151. Patented May 31, 1881.

Witnesses
Henry L. Washburn
Geo. G. Carver

Inventor.
Wm. S. Post
By Attorney

UNITED STATES PATENT OFFICE.

WILLIAM S. POST, OF BOSTON, MASSACHUSETTS.

REFRIGERATOR.

SPECIFICATION forming part of Letters Patent No. 242,151, dated May 31, 1881.

Application filed July 21, 1880. (No model.)

*To all whom it may concern:*

Be it known that I, WILLIAM S. POST, of Boston, county of Suffolk and State of Massachusetts, have invented certain new and useful Improvements in Refrigerators; and I do hereby declare that the following is a full, clear, and exact description of my invention, which will enable others skilled in the art to which it appertains to make and use the same, reference being had to the accompanying drawings.

My invention relates to improvements in refrigerating apparatus for preserving articles of food. Its purpose is to bring in contact with the articles to be preserved a circulating volume of cool air, whereby moisture and odors are removed and carried off, a low temperature maintained, the air purified in the preserving-chambers, and the refrigerating material economized and utilized after it is dissolved. This is effected especially by dividing and superchilling the volume of air as it passes downward by gravitation between the ice-tanks and out into the preserving-chambers.

Figure 1:
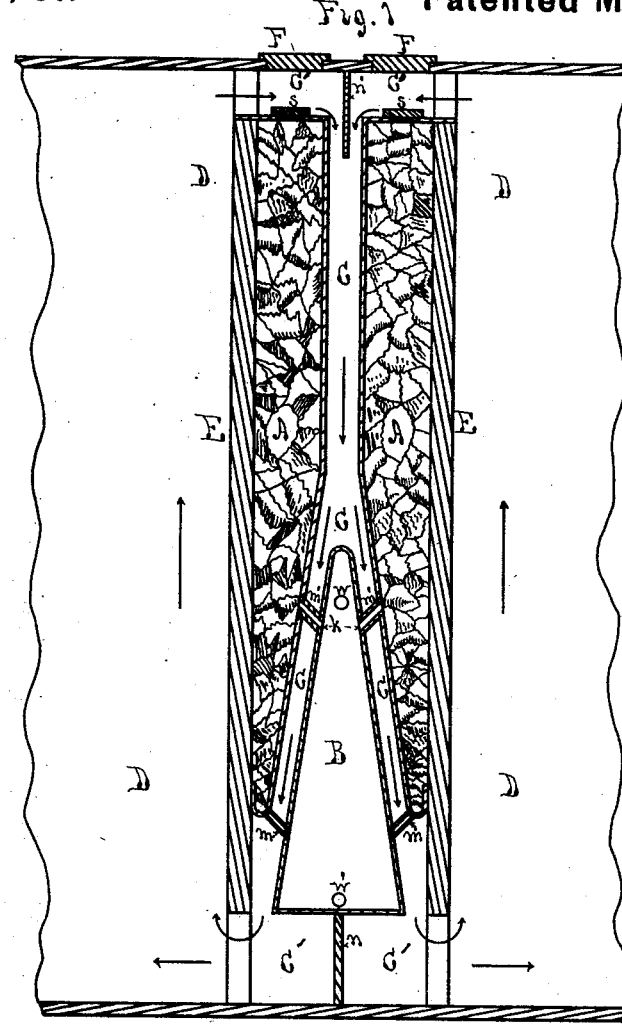
Figure 2:
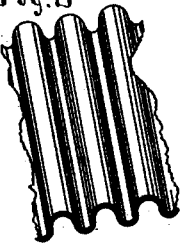

In the drawings, Figure 1 represents a vertical section of my refrigerator; Fig. 2, a section of corrugated iron intended to be used in making the tanks when large condensing-surfaces are required.

To effect my purpose of separating and dividing the volume of air and superchilling it, my invention consists in the combination, with the preserving chamber or chambers D D, of two separate and distinct tanks, A A, air-tight or nearly so, made of galvanized iron or other suitable conducting material, filled with ice, salt and ice, or other refrigerating substances, said tanks being placed vertically in the refrigerator, also made air-tight or nearly so, with a flue or conduit, C C, between said tanks, and spaces C' C' above and below said tanks for circulation of air. The upper portion of the inside walls and the entire outside walls of said tanks are made vertical. The lower portions of said inside walls incline outward to the bottom of the outer walls. At the junction of said inner and outer walls their ends are slightly rounded; and also, if an auxiliary tank, B, be placed between the lower walls of said tanks A A, made likewise of galvanized iron or other suitable material, with air spaces or flues C C between said auxiliary tank B and said tanks A A, said tank B is connected with the tanks A A by pipes $m$ $m$ and $m'$ $m'$. The lower connecting-pipes, $m$ $m$, conduct the liquid from the refrigerating material in the tanks A A into said tank B, and the pipes $m'$ $m'$ conduct only cold air from the refrigerating material in the tanks A A into the tank B until the liquid in the tank B rises to the line marked $k$ in tank B, when the pipes $m'$ $m'$ become drip-pipes. The tank B, being filled with the dissolved or liquid ice, serves as an additional cooling or refrigerating tank, and the air passing between tanks A A and B is divided and superchilled. An outlet for an overflow or drip pipe is shown at W, and a bent or siphon-shaped pipe may be employed to prevent air entering the tank B. W at the bottom of tank B is for use as an outlet for clearing or emptying the tank. These tanks, constructed and connected by pipes, as described, are placed in the center or at the sides or ends of a car, room, or chamber, but when placed in the center of a chamber or between two rooms the central vertical portion of the flue or conduit C C may be divided at the top and bottom by the partitions $n'$ $n$, to secure a deflection at the top of the volume of air entering from either chamber and a direction of the volume of air at the bottom into either chamber, as shown by the curved arrows. After passing said partition $n'$ at the top of the flue, the columns of air unite in their passage downward, and the current again divides at the top of the auxiliary tank B, passing, as shown by the straight arrows, down to the right and left between the tanks A A and B, and then superchilled into the spaces C' C' below said tanks, thence into the preserving-chambers D D, and passing over and around the articles of food, and, becoming rarefied, it rises and passes into the spaces C' C' above the tanks, when, again divided by the partition $n'$, the columns of air descend as before, thus continually divided and circulating through and through the conduits or flues and the preserving-chambers. This operation secures the preservation of perishable articles of food by means of the continued divided circulation of cold air flowing by force of gravity through the flues, and thence into the preserving-chambers without contact of the articles of food with the refrigerating material. The moisture and odors from the articles of food are absorbed and carried off, the circulating cool air purifies and desiccates the air in the preserving-chambers, and any moisture is condensed and appears as frost or congealed vapor on the surfaces of the refrigerating-tanks.

The walls E E between the tanks A A and the preserving-chambers, made of wood or of any non-conducting material, prevent the lateral escape of cold air and cause it to flow downward in and through the flues C C. When large condensing-surfaces are desired in the tanks the use of corrugated iron, as shown in Fig. 2, will afford additional air-spaces between the sides of the tanks A A and the non-conducting walls E E. If the tanks are placed at the ends or sides of the car or chamber, no air-dividing partitions $n\ n'$ will be required.

For the purpose of filling the tanks A A with ice or other refrigerating material, I use the apertures F F, fitted with covers of wood, flanged and packed to be air-tight.

Prior to my invention refrigerators have had a tank for refrigerating material, and through the side of the tank a pipe for air has been attached, said pipe extending downward and communicating with the interior of the refrigerator; but this is not any part of my invention.

Having described my invention, what I claim is—

1. The combination, with a preserving chamber or chambers, D D, of tanks A A for containing refrigerating material, said tanks being separate and distinct from each other, and having a flue or conduit between them and the air-spaces $C'\ C'$ above and below said tanks, all constructed as described, as and for the purpose set forth.

2. The combination, with a preserving chamber or chambers, D D, of tanks A A and B for refrigerating material, said tanks A A being separate and distinct from each other, and all the tanks having flues or conduits between them, C C, with connecting-pipes $m\ m$ and $m'\ m'$ between said tanks A A and B, with the air-spaces $C'\ C'$ above and below said tanks, all constructed as described, as and for the purpose set forth.

3. The combination, with a preserving chamber or chambers, D D, of tanks A A and B for refrigerating material, said tanks A A being separate and distinct from each other, and all the tanks having flues or conduits between them, C C, with connecting-pipes $m\ m$ and $m'\ m'$ between said tanks A A and B, with the air-spaces $C'\ C'$ above and below said tanks, and the partitions $n\ n'$, all constructed as described, as and for the purpose set forth.

WM. S. POST.

Witnesses:
GEO. E. BELTON,
JOHN McCORMACK.